Feb. 12, 1957 E. M. BRADBURD 2,781,491

TRANSMISSION SYSTEMS

Filed Dec. 11, 1952 2 Sheets-Sheet 1

INVENTOR
ERVIN M. BRADBURD
BY Percy P. Lantzy
ATTORNEY

INVENTOR
ERVIN M. BRADBURD
BY Percy P. Lantzy
ATTORNEY 2,781,491

TRANSMISSION SYSTEMS

Ervin M. Bradburd, Fairlawn, N. J., assignor to International Telephone and Telegraph Corporation, a corporation of Maryland Application December 11, 1952, Serial No. 325,480

10 Claims. (Cl. 332—19)

This invention relates to transmission systems and more particularly to a means and method for maintaining constant frequency separation between the carriers of two transmitters.

It is required by the FCC for television transmission that the aural carrier frequency be constantly maintained 4.5 mc. higher than the visual carrier frequency within a permitted deviation of ±5000 cycles per second. However, it is to be understood that the electronic system herein described in connection with maintaining the carrier signals of the visual and aural transmitters of a television transmission system at a constant frequency separation as required by the FCC, such a system may be employed in other types of transmission systems where it may be desirable to maintain such a constant frequency separation.

An object of this invention is the provision of a means and method for locking two transmitter signals to a common crystal frequency whereby the frequency drift of one transmitter carries the other transmitter a corresponding number of cycles thereby maintaining a substantially constant difference frequency.

Another object of this invention is the provision of a circuit arrangement to lock the aural and visual transmitters of a television transmission system to a common crystal frequency such that a frequency drift of the visual transmitter carries the aural transmitter a corresponding number of cycles thereby maintaining a substantially constant difference frequency.

Still another object of this invention is the provision of a circuit arrangement whereby the center frequency of the aural or signal modulated oscillator is stabilized by phase locking with an aural reference oscillator. This stabilized center frequency is added to the visual transmitter signal at a predetermined fraction of the radiated power, the resultant sum having subtracted therefrom a predetermined multiple of the aural reference oscillator in such a manner that an upward shift in visual signal is obtained. The resultant upward shift of the visual signal equivalent to the first harmonic of the reference oscillator signal, constitutes a predetermined fraction of the audio carrier signal maintained at a constant frequency separation from a corresponding predetermined fraction of the visual transmitter signal.

A feature of this invention is the provision of a circuit arrangement to stabilize the center frequency of the aural oscillator having a Miller effect modulator intimately coupled to a signal oscillator oscillating at a predetermined frequency, and a frequency divider to divide by a predetermined factor the center frequency of the signal modulated oscillator. A phase comparator is further included to compare the divided output of a reference oscillator to the substantially equivalent divided output of the signal modulated oscillator, whereby discrepancies therebetween generate a control voltage to act upon said Miller effect modulator for correction of the center frequency of the signal oscillator.

Another feature of this invention is the provision of a dual mixing arrangement whereby the stabilized modulated aural center frequency is added to a predetermined fraction of the radiated visual carrier in a first mixing circuit. A second mixing circuit coupled to said first mixing circuit wherein a predetermined multiple, including the integral one, of the reference oscillator signal is subtracted from the resultant sum of the aural and visual signal to achieve an upward shift in frequency thereby establishing the aural carrier frequency, at a predetermined fraction of the radiated frequency, separated from a predetermined fraction of the visual carrier frequency by a predetermined constant frequency difference.

Still another feature of this invention is a method for locking the carrier frequencies of two transmitters at a substantially constant difference frequency in such a manner that a shift of frequency of a first transmitter will carry the frequency of a second transmitter to maintain the substantially constant difference frequency therebetween comprising the following steps. The output of a signal modulated oscillator of said second transmitter is divided by a predetermined factor. The output of a reference oscillator associated with said second transmitter is divided by another predetermined factor such that both these divided outputs are substantially equivalent. Both the divided outputs are phase compared in a manner to maintain the stability of the center frequency of said signal modulated oscillator. The stabilized signal from the modulated oscillator is added to a predetermined fraction of the carrier frequency of said first transmitter, the resultant sum having subtracted from it a predetermined multiple, including one, of said reference oscillator signal to achieve a constant frequency offset between the signals of said first and said second transmitters at a predetermined fraction of the radiated frequency signals.

The above-mentioned and other features and objects of this invention will become more apparent by reference to the following description taken in conjunction with the accompanying drawings, in which.

Figures 1, 4:
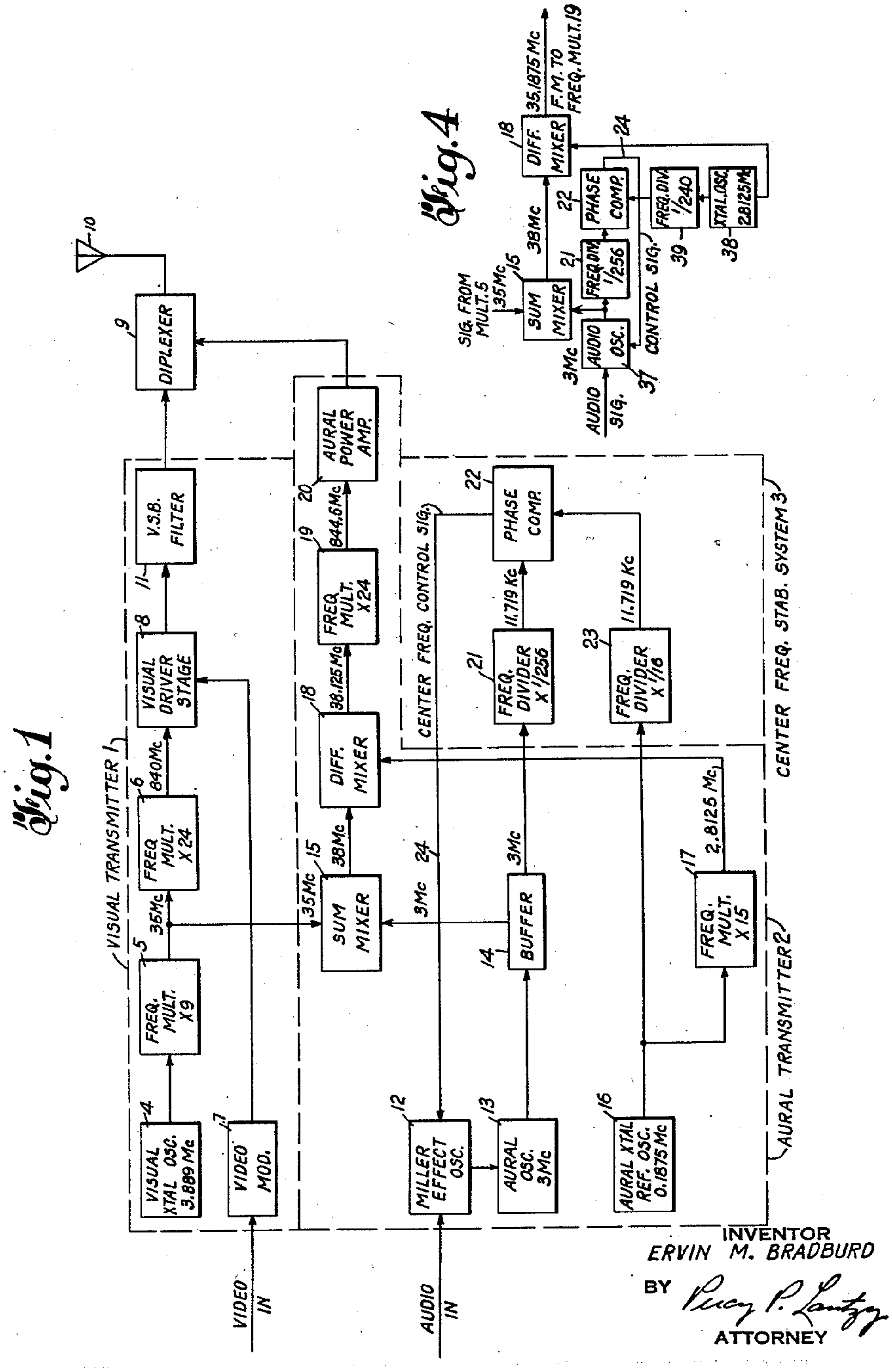
Fig. 1 is a block diagram of an embodiment of an ultra-high frequency television transmission system in accordance with the principles of this invention.
Fig. 4 is a block diagram of another embodiment of the center frequency stabilizing system and a portion of the aural transmitter of this invention.
Figure 2:
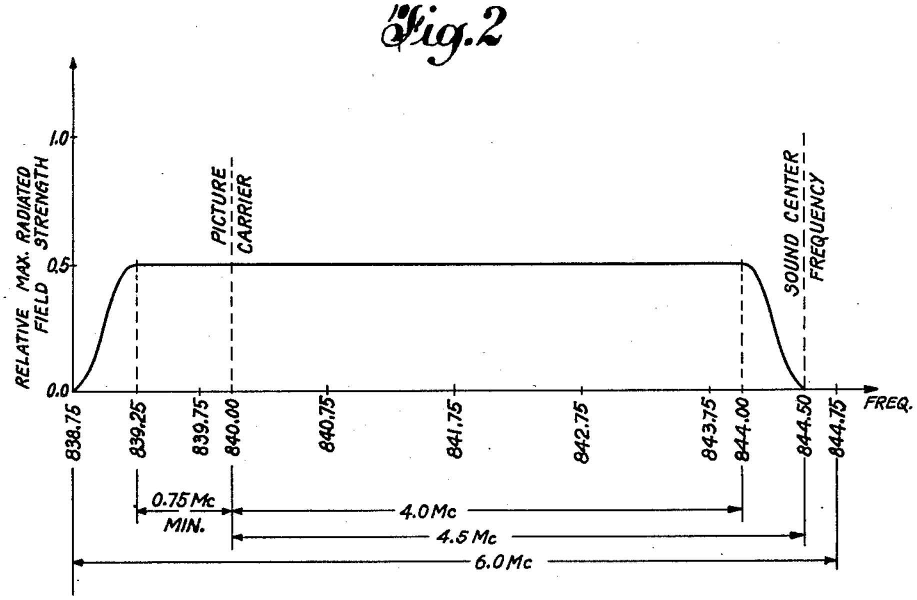
Fig. 2 is a graphic representation of an idealized television picture transmission amplitude characteristic.

Referring to Fig. 1, a U. H. F. television transmission system is illustrated to include a visual transmitter 1, an aural transmitter 2, and a center frequency stabilizing system 3 cooperating with a modulator, a signal oscillator, and a reference oscillator of transmitter 2 to maintain the required separation of the visual and aural carrier frequencies at the required 4.5 mc. separation as specified by the FCC for vestigial sideband transmission of the composite video and audio signal. The theoretical amplitude characteristic of such a signal is illustrated in Fig. 2.

Visual transmitter 1 in broad terms performs the following operations. Generates an R. F' carrier of proper frequency, stability, and power through means of crystal oscillator 4, frequency multipliers 5 and 6. Accepts the composite video signal from the pick-up facilities and raises its power level in video modulator 7 to the value required at visual driver stage 8 to amplitude modulate the visual carrier. Delivers the required video portion of the vestigial sideband signal to the antenna system including diplexer 9 and antenna 10 through means of the vestigial sideband filter 11. The operations herein outlined are the normal operations of any visual transmitter, however, the visual transmitter of this invention performs one additional operation of supplying a frequency signal at a predetermined fraction of the visual radiated carrier frequency to the aural transmitter 2 for addition to the stabilized modulated signal of the signal oscillator of transmitter 2 for cooperation in locking the carriers of the two transmitters at a constant frequency difference.

As illustrated in Fig. 1, certain specific frequencies have been selected for the purpose of explaining the operation of the transmission system of this invention. The visual crystal or signal wave oscillator 4 generates a frequency of 3.889 mc. with a frequency stability sufficient to remain within the required limits of frequency stability for a video transmitter as established by the FCC. The generated frequency signal from oscillator 4 is multiplied by frequency multiplier 5 a total of nine times, preferably in a number of steps with each multiplication step not exceeding three. Such a multiplication produces a frequency of 35 mc. which is further multiplied twenty-four times by frequency multiplier 6 to produce the visual carrier frequency of 840 mc. This latter multiplication process likewise is accomplished in steps, each step preferably not exceeding multiplication by three. The video signal from video modulator 7 having a desired power level and proper phase for negative transmission is applied to visual driver stage 8 wherein high level amplitude modulation takes place to produce a double sideband picture signal for coupling to the vestigial sideband filter 11 wherein the lower sideband is attenuated to cause substantially the reproduction of the picture signal as shown in Fig. 2. This picture signal is then coupled to the antenna system hereinbelow described comprising diplexer 9 and antenna 10.

The aural transmitter 2 performs the following operations. The audio input signal is applied to a modulator 12 to modulate the aural or signal modulated oscillator 13 which in turn provides a modulated signal through buffer amplifier 14 to a mixer 15 wherein the frequency signal prior to the second group of frequency multipliers 6 of the visual transmitter 1 is added thereto to produce a resultant sum frequency signal. Aural transmitter 2 further includes an aural crystal reference oscillator 16 having a frequency multiplier 17 coupled to the output thereof and increasing the reference oscillator signal a predetermined factor. The output from frequency multiplier 17 is coupled to mixer 18 wherein the resultant sum frequency has subtracted from it the multiplied output of reference oscillator 16 to produce an upward shift in the visual signal coupled from frequency multiplier 5 thereby establishing a frequency separation between the carriers of two transmitters at a predetermined fraction of the radiated carrier frequency of both transmitters 1 and 2. Following this upward shift of frequency, the frequency modulated aural signal is multiplied by frequency multiplier 19 to establish the desired radiated frequency and as a result the required frequency separation between the radiated frequency carriers of the two transmitters. The aural carrier is then applied to an aural power amplifier which raises the power therein a desired amount for coupling to the antenna system for transmission with the visual signal.

The antenna system herein employed provides a means whereby the visual signal and the aural signal may be radiated from the same antenna rather than separate antennas as has heretofore been the practice. This simultaneous transmission from antenna 10 is made possible by means of diplexer 9 which permits both transmitters to feed a single antenna without interaction between the transmitters. The theory of operation of such a diplexer is based on the well-known Wheatstone bridge circuit wherein the aural signal is connected diagonally between two corners of the bridge and the visual signal is connected between the other two corners of the bridge. The arms of the bridge include two equal resistances and two equal reactances so arranged that the bridge is balanced. The transmitter may deliver power to the resistors, but they are completely isolated from each other through the bridge arrangement such that there is no interaction between the signals emitting from the transmitters. This Wheatstone bridge arrangement may be structurally obtained by combining a coaxial Y section with a balun for connection of the two non-interacting signals to antenna 10.

Cooperating with the aural transmitter is a center frequency stabilizing system 3 which comprises a frequency divider 21 coupled to buffer 14 to divide the aural oscillator 13 output a predetermined amount by coupling to a phase comparator 22. The output from aural crystal reference oscillator 16 is also divided by frequency divider 23 a predetermined amount such that the frequencies emitting from dividers 21 and 23 are substantially equivalent and the phases thereof are compared in phase comparator 22. A frequency shift in the aural oscillator 13 will cause a voltage to be produced at the output of comparator 22 which is fed back through line 24 to the modulator 12 such that the center frequency of aural oscillator 13 will be corrected by the operation of the control signal applied to the grid of modulator 12.

To be consistent with the establishing of frequencies for the components for visual transmitter 1, the frequencies of the various components of aural transmitter 2 and the center frequency stabilizing system 3 are now set forth. Aural oscillator 13 produces an output center frequency of 3 mc., and the reference oscillator 16 has an operating frequency of 0.1875 mc., the difference between the aural center frequency and the visual center frequency at a frequency level $\frac{1}{24}$ of the actual radiated frequency. The output of oscillator 13 is divided by $\frac{1}{256}$ and the output of oscillator 16 is divided by $\frac{1}{16}$ to produce a reference frequency of 11.719 kc. These divided outputs are then phase compared by means of comparator 22, output therefrom resulting from a phase error between the divided signals acting to stabilize the center frequency of oscillator 13 through means of the Miller effect modulator 12.

The stabilized 3 mc. signal from oscillator 13 is mixed with the 35 mc. signal from frequency multiplier 5 and mixer 15 to produce an output frequency of 38 mc. This in turn has subtracted from it in mixer 18 the output of reference oscillator 16 multiplied fifteen times to offset the visual signal .1875 mc. at a frequency level $\frac{1}{24}$ below the actual radiating signal. Multiplication of this offset signal by a factor of 24 produces the aural carrier frequency of 844.5 mc. which is 4.5 mc. higher than the visual carrier frequency. This 4.5 mc. separation will be maintained by cooperation between the center frequency stabilizing system 3 and the dual mixing process carried out in mixers 15 and 18. A shift of 1 mc. at the output of multiplier 5 will produce a resultant sum of 39 mc. at the output of mixer 15, the 3 mc. signal from oscillator 13 being stabilized within allowable limits. The subtraction process in mixer 18 produces an output of 36.1875 mc. which is the same offset condition that existed at $\frac{1}{24}$ the radiated frequency prior to the junction of the assumed error thereby illustrating that the frequency separation is maintained constant regardless of error in transmitter 1.

Figure 3:
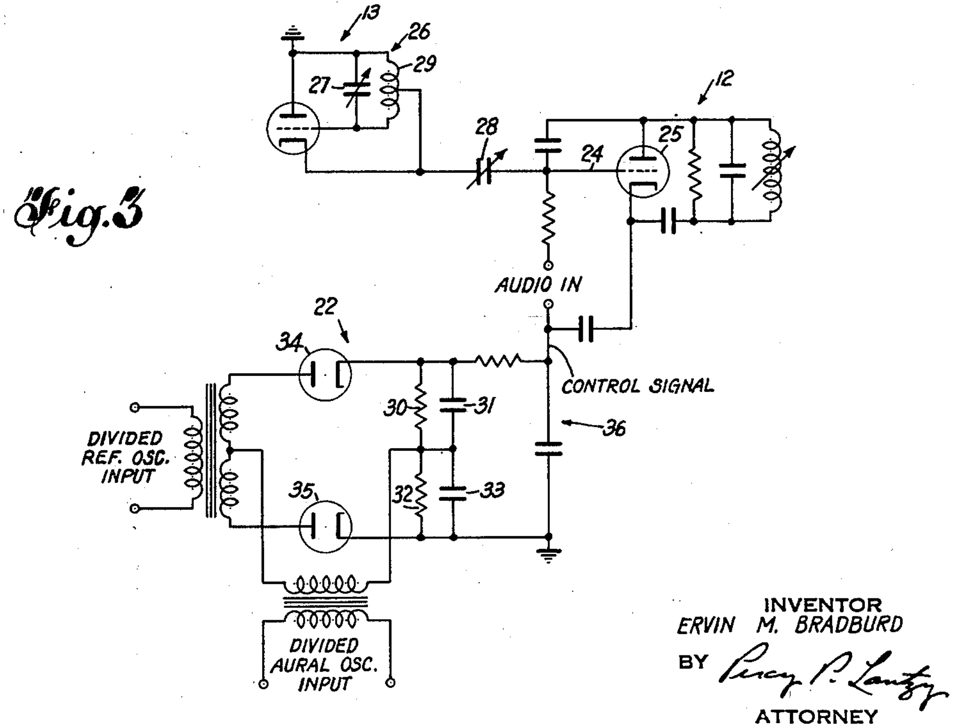
Fig. 3 is a schematic diagram of an embodiment of a portion of the aural frequency stabilizing system incorporated in Fig. 1.

Fig. 3 is a schematic diagram illustrating the means in which the mean center frequency of the aural oscillator 13 is stabilized by comparison to a reference oscillator 16. The schematic diagram of Fig. 3 illustrates aural oscillator 13 as being a Hartley type oscillator, the voltage of which is modulated by a Miller effect modulator 12 wherein the audio signal and the center frequency control signal is fed to the control grid 24 of electron discharge device 25. The control signal is developed in the phase comparator 22, shown in Fig. 3 to be a balanced phased type detector receiving energy corresponding to the divided frequency signal of reference oscillator 16 and a correspondingly divided signal from oscillator 13.

Variation of the effective capacitance of the grid circuit of electron discharge device 25 is injected across the aural oscillator tank circuit 26. This capacitive change is proportional to the total bias voltage on grid 24 of modulator 12 which is the sum of the program audio frequency input and the center frequency stabilizing phase detector output voltages. Thus the modulator 12 not only converts the audio frequency voltage into the desired frequency variations of the oscillator 13 output, but also acts in conjunction with the center frequency stabilizing system 3 to maintain the aural oscillator center frequency in exact coincidence with that of the temperature controlled crystal reference oscillator 16.

The linear relationship between the input capacitance and the transconductance of a vacuum tube amplifier is used to swing the frequency of a Hartley type oscillator. Operating the modulator in the region of linear transconductance and applying a modulating signal to control grid 24 injects an input capacitance across tank circuit 26 which is directly proportional to the amplitude of the modulating signal.

The frequency swing is directly proportional to the change of injected capacitance, and inversely proportional to the fixed tank capacitance 27. To obtain a fixed frequency swing for a given change in input capacitance, over the range of oscillator capacitance required to cover the transmitting frequency band, an adjustable capacitance 28 couples the modulator to the oscillator. To reduce the radio frequency signal on the modulator grid, the effective capacitance is injected across only a portion of the tank inductance 29.

The center frequency stabilization system 3 is based on the automatic synchronization of two oscillators, a crystal reference oscillator 16 and a frequency modulated oscillator 13. The outputs of the crystal oscillator 16 and the frequency modulated oscillator 13 are passed through separate frequency dividers 23 and 21, respectively, and combined in a balanced phase detector or comparator 22. The rectified and integrated difference output actuates the modulator so as to pull in and locate the aural oscillator mean frequency to that of the crystal oscillator. If synchronization of the two frequencies is assumed, the output of comparator 22 depends upon the relative phase. An attempt of the mean frequency of aural oscillator 13 to drift from the crystal frequency results in an instantaneous change of the phase difference of the two oscillators and a corresponding change in the rectified output of the phase detector, which will act on the modulator 12 to increase or decrease the total aural oscillator tank capacitance and thereby maintain synchronization.

If synchronization of the two frequencies is not assumed, the output of the detector is the beat difference between the frequency divided crystal oscillation and the frequency divided modulated aural oscillation. This beat frequency, acting on the modulator 12, swings the carrier frequency of the aural oscillator 13 at a rate equal to the beat frequency and with a deviation proportional to the amplitude of the beat. If the deviation is sufficiently large and the beat rate sufficiently low, the instantaneous frequency of the modulated oscillator 13 will be in near synchronization with the crystal oscillation for a sufficient number of operation cycles for synchronization to occur and will be maintained as described in the succeeding paragraph.

It would not be possible to synchronize a frequency modulator oscillator with a crystal oscillator at the carrier frequency because under modulation the carrier frequency component amplitude passes through innumerable conditions of zero amplitude. But if frequency division is performed, as accomplished in divider 21, the effect is to reduce the frequency swing or modulation index to an extent where the modulation of carrier frequency component frequency is very small. As, for example, if a maximum swing of 3 kc. occurs at an oscillator frequency of 4 mc., a frequency division of 256 will reduce the maximum swing to 3000/256 or 12 cycles. Considering an audio frequency of 30 cycles, the maximum modulation index is 12/30 or 24°. This index reduces the carrier to 0.96 of its unmodulated value, giving a substantially constant carrier for synchronization. As hereinabove explained, the crystal oscillator frequency is also divided in frequency divider 23 to correspond substantially to the divided frequency of the aural oscillator.

Frequency division in dividers 21 and 23 is accomplished through untuned multivibrator circuits which depend mainly on resistive and capacitive components for both critical and non-critical functions. This results in stable operations over long periods of time as well as extreme ease in initial alignment and a minimum operation and maintenance.

The use of a balanced phase detector 22 represents the condition that the instantaneous phase change at the detector must not exceed ±90°, as this is the maximum range over which the detector operates as a phase control device. The frequency division which occurs in dividers 21 and 23 reduces the phase change due to modulation to less than 24° thereby providing operation of this system within the control of the phase detector when the system is under synchronization.

The physical picture of the action of the balanced phase detector 22 may be considered as the action of two peak reading diode detector circuits whose outputs are combined in opposition. The time constants of the output network comprising resistor 30, condenser 31 and resistor 32, condenser 33 are high enough to prevent any appreciable decay in the peak voltage during the time when their respective diode 34 or 35 is not conducting. If a 90° phase relation between the two identical voltages is assumed, the voltage appearing across diode 34 and its output network is equal to the voltage across diode 35 and its output network, the difference therebetween producing a zero output voltage which is the normal operating condition of comparator 22. The output circuit 36 of phase detector 22 is an integrator and low pass filter which responds only to slow main frequency drifts and removes the residual modulation.

Any attempt at slow drift of the mean aural oscillator frequency will shift the phase direction to give a direct output voltage to the modulator 12. This voltage will change the injected capacitance coupled to the aural oscillator 13 so that the total capacitance and frequency will remain constant, therefore, operation may occur at any point within the region of control, and the mean center frequency of oscillator 13 will be synchronized with the frequency of reference oscillator 16. Similarly, should there be any modification in any parameter in the oscillator circuit which would normally change the frequency, the phase will shift to compensate for the parameter change and the frequency will remain constant.

To briefly summarize with reference to Fig. 2, the visual oscillator 4 multiplied by a predetermined factor in multiplier 5 provides a frequency a predetermined factor less than the radiated frequency, wherein this predetermined fraction of radiated frequency is 1/24 or 35 mc. of the desired visual transmitter output frequency. This 35 mc. signal derived from visual oscillator 4 is coupled to mixer 15 to be combined with the output of oscillator 13, the resultant sum thereof has subtracted therefrom the reference oscillator signal multiplied a predetermined fraction to produce a predetermined fraction of the aural carrier frequency. This carrier frequency has superimposed thereon FM modulation through the action of the Miller effect modulator 12 on the aural oscillator 13. The resultant frequency, in this descriptive example, after the dual mixing process occurring in mixers 15 and 18 is 1/24 of the desired aural carrier frequency. At this predetermined fraction of the radiated frequency, the aural and visual carriers are offset or differ in frequency by 0.1875 mc.

This difference frequency at $\frac{1}{24}$ the radiated carrier frequency is selected as the frequency of the reference source 16. This crystal oscillator frequency is divided 16 times and becomes the reference frequency of 11.719 kc. for the phase comparison circuit 22 of the center frequency stabilizing system 3. The aural oscillator 13, operating in this example at 3.0 mc., is divided in frequency 256 times and phase compared to the reference frequency derived from oscillator 16. The error occurring between the divided output of oscillator 13 and reference oscillator 16, as recognized by phase comparison circuit 22, is used to phase lock the mean center frequency of aural oscillator 13 to the reference oscillator 16 through the operation of the Miller effect modulator 12.

As hereinabove stated, the 0.1875 mc. signal from reference oscillator 16 is multiplied in frequency fifteen times to yield an output of 2.8125 mc. The visual transmitter signal generated by visual oscillator 14 and multiplied by multiplier 5 at $\frac{1}{24}$ the final output frequency is added to the aural signal of 3.0 mc. in mixer 15, and then in a second mixer the 2.1825 mc. signal is subtracted from the above resultant sum. In this manner, the visual signal is shifted the necessary 0.1875 mc. upward in frequency, and the FM modulation from the coaction of modulator 12 and oscillator 13 supplies the modulated aural carrier frequency at $\frac{1}{24}$ of the final aural radiating frequency.

The stability of the phase locking system is such that the two carriers, aural and visual, will be locked so that at the transmitter output frequency the maximum error in frequency will be that of the aural reference 0.1875 mc. multipled twenty-four times, the predetermined fraction of the carrier signals, after mixing of the visual and aural signals occur, prior to achieving the full frequency signal for radiation. A frequency shift in visual oscillator 4 resulting from internal or external effects will either raise or lower the visual signal at $\frac{1}{24}$ the final output frequency and likewise will raise or lower the sum frequency resulting from the mixing of the signal from multiplier 5 and buffer 14. However, it will be noted that since the reference source is equivalent to the offset required and is still subtracted from the resultant sum, with the oscillator 4 error being reflected in this sum, the resultant difference between the resulting visual signal and aural signal will still be .1875 mc. spread at $\frac{1}{24}$ the radiated signal, $\pm$ a possible shift of the aural reference oscillator 16.

Inasmuch as the FCC requires that the difference between the aural and visual signals at the final frequency drift be less than $\pm 5000$ cycles, the frequency tolerances of the aural reference source 16 can be $\pm 5000$ cycles out of 4.5 mc. or approximately 0.1 percent. Thus, any crystal oscillator would more than supply the necessary stability as specified by the FCC. If a crystal having a stability of 10 parts per million is selected for the aural reference oscillator 16, it would be possible to obtain a lock of the aural and visual carriers to within $\pm 45$ cycles which obviously far exceeds the FCC specification.

A further advantage of this circuit is that the aural frequency modulator and circuit accomplishing the upward shift of the visual signal to form the aural carrier signal will be the same for all TV channels. Only the two mixers used for frequency offsetting and injection of the audio modulation will be affected by the particular channel selected for operation.

The principle outlined hereinabove, for a specific example of a U. H. F. TV transmitter, can be extended to operate at other carrier frequencies and offset. The general relationships to be satisfied in applying this principle to other carrier and offset conditions are outlined below. Let $F_1$ be $$\frac{1}{X}$$

of the desired transmitter output frequency. Let $\Delta F_1$ be the offset in frequency. Then the necessary shift in frequency S is $$S=\Delta\frac{F_1}{X}$$

If the aural oscillator frequency is A, then $$\frac{F_1}{X}+A-NS \text{ is } =\Delta\frac{F_1}{X}+\frac{F_1}{X}$$

is the general relationship to be satisfied in the dual mixer process where N is the harmonic of the shift frequency S to be subtracted in the second mixer, or in other words N is equal to the factor by which the reference oscillator signal is multiplied.

The second relationship to be satisfied is that $$\frac{A}{M}=\frac{S}{K}$$

for the phase comparator 22 locking the aural oscillator to the shift frequency S. M and K are integral values, although in general they may be the ratio of any whole numbers. Therefore, from the above equations it may be shown that $A-NS=S$, $A=(N+1)S$, and $$A=\frac{M}{K}S$$

Therefore, it may be shown that $$\frac{M}{K}=N+1$$

The chosen value of M, K, and N is determined by convenience at the particular operating frequencies. In the specific example used herein to describe the principle of this invention $M=256$, $K=16$, $S=0.1875$ mc., and $N=15$.

Referring to Fig. 4, a block diagram is illustrating a modification of the reference oscillator 16 and associated circuitry cooperating with center frequency stabilizing system 3 and the difference mixer 18 of Fig. 1. Those components that remain unchanged in function and structure have identical reference characters in Fig. 4 as those corresponding components shown in Figs. 1 and 3. Audio oscillator 37 includes the Miller effect modulator 12 and aural oscillator 13 of Fig. 1 and functions in the same manner to modulate the 3 mc. carrier signal and to cooperate with system 3 to maintain a substantially constant center frequency.

The modification is incorporated in reference oscillator 38 wherein the temperature stabilized signal is 2.8125 mc. and is used directly to mix with the output of mixer 15 in mixer 18 to establish the desired constant frequency offset between visual and aural center frequency at $\frac{1}{24}$ of the visual and aural carrier frequency. Employing such an arrangement provides that the predetermined multiple of oscillator 38 output, subtracting from the 38 mc. output of mixer 15, is one rather than the multiplying factor of fifteen used in the circuit of Fig. 1. Furthermore, to derive the reference signal for application to phase comparator 22 substantially equivalent to the divided signal of oscillator 37 it is necessary to employ a frequency divider 39 having a dividing factor of $\frac{1}{240}$.

The general relationships in this case are substantially identical to those set down heretofore except that NS is now equal to the frequency of the aural reference crystal oscillator 38. Therefore, $A-NS=S$ or $$A=S(N+1)$$

and $$\frac{A}{M}=\frac{NS}{K}$$

The K employed here is of course different in value from that employed for K hereinabove. Therefore, it may be shown that $$\frac{MN}{K}=N+1$$

and in the present situation $N=15$, $M=256$, $K=240$, and $S=0.1875$ mc.

While I have described above the principles of my invention in connection with specific apparatus, it is to be clearly understood that this description is made only by way of example and not as a limitation to the scope of my invention as set forth in the objects thereof and in the accompanying claims.

I claim:

1. A transmission system comprising a first transmitter including a signal wave oscillator, a second transmitter including a signal modulated oscillator, first and second mixing circuits and a reference oscillator, and a center frequency stabilizing system, means coupling the output of said modulated oscillator to said stabilizing system, means coupling the output of said reference oscillator to said stabilizing system, said stabilizing system comparing the phase of the output signals of said modulated oscillator and said reference oscillator for development of a control signal, means coupling the control signal to said modulated oscillator to stabilize the center frequency of said moduated oscillator, means coupling said first mixing circuit to the output of said signal wave oscillator, means coupling said first mixing circuit to the output of said modulated oscillator, said first mixing circuit adding the signal from said signal wave oscillator to the stabilized signal of said modulated oscillator, means coupling said second mixing circuit to the output of said first mixing circuit, means coupling said second mixing circuit to the output of said reference oscillator, said second mixing circuit subtracting the signal from said reference oscillator from the resultant signal output of said first mixing circuit to provide a constant frequency offset between the signal from said signal wave oscillator and the resultant output of said second mixing circuit, a frequency multiplier coupled to the output of said second mixing circuit to provide the desired radiation frequency signal for said second transmitter, and a frequency multiplier coupled to said signal wave oscillator to provide the desired radiation frequency signal for said first transmitter.

2. A transmission system comprising a reference oscillator, a signal wave oscillator, a signal modulated oscillator, a first mixing means, a second mixing means, and a center frequency stabilizing system, means coupling the output of said modulated oscillator to said stabilizing system, means coupling the output of said reference oscillator to said stabilizing system, said stabilizing system comparing the phase of the output signals of said modulated oscillator and said reference oscillator for development of a control signal, means coupling the control signal to said modulated oscillator to stabilize the center frequency of said modulated oscillator, means coupling said first mixing circuit to the output of said signal wave oscillator, means coupling said first mixing circuit to the output of said modulated oscillator, said first mixing circuit adding the signal from said signal wave oscillator to the stabilized signal of said modulated oscillator, means coupling said second mixing circuit to the output of said first mixing circuit, means coupling said second mixing circuit to the output of said reference oscillator, said second mixing circuit subtracting the signal from said reference oscillator from the resultant signal output of said first mixing circuit to provide a constant frequency offset between the signal from said signal wave oscillator and the resultant output of said second mixing circuit.

3. A television transmitter comprising a visual transmitter including a visual oscillator, an aural transmitter including an aural oscillator, a reference oscillator, a first mixing circuit, and a second mixing circuit, and a center frequency stabilizing system, means coupling the output of said reference oscillator to said stabilizing system, said stabilizing system comparing the phase of the output signals of said aural oscillator and said reference oscillator for development of a control signal, means coupling the control signal to said aural oscillator to stabilize the center frequency of said aural oscillator, frequency multiplier means coupling said first mixing circuit to the output of said visual oscillator, means coupling said first mixing circuit to the output of said aural oscillator, said first mixing circuit adding a predetermined multiple of the frequency of the signal from said visual oscillator to the stabilized signal of said aural oscillator, means coupling said second mixing circuit to the output of said first mixing circuit, frequency multiplier means coupling said second mixing circuit to the output of said reference oscillator, said second mixing circuit subtracting a predetermined multiple of the frequency of the signal from said reference oscillator from the resultant signal output of said first mixing circuit to provide a constant frequency offset between the signals of said first and said second transmitters at a predetermined fraction of the desired radiated frequency signal of each transmitter.

4. A television transmitter according to claim 3, wherein said aural oscillator includes a signal oscillator and an audio signal modulator interconnected to cooperate in producing a frequency modulated aural signal and responsive to said control signal to maintain the mean center frequency of said signal oscillator constant.

5. A television transmitter according to claim 4, wherein said stabilizing system comprises a first frequency divider coupled to the output of said reference oscillator, a second frequency divider coupled to the output of said signal oscillator, said frequency dividers providing substantially equal frequency outputs, and a phase comparator coupled to the outputs of said first and said second frequency dividers to detect phase error therebetween and to supply a resultant control signal to said audio signal modulator.

6. A television transmitter according to claim 5, wherein said phase comparator comprises a balanced phase detector having an integrator and low pass filter output circuit to couple a control voltage corresponding to a detected phase error to the grid of said audio signal modulator.

7. A television transmitter according to claim 3, wherein said stabilizing system comprises a first frequency divider coupled to the output of said reference oscillator, a second frequency divider coupled to the output of said aural oscillator, said frequency dividers providing substantially equal frequency outputs, and a phase comparator coupled to the outputs of said first and said second frequency dividers to detect phase error therebetween and to supply a control signal to said aural oscillator.

8. A television transmitter according to claim 3, wherein said reference oscillator comprises a temperature compensated crystal controlled oscillator.

9. A transmission system comprising a first transmitter including a crystal controlled oscillator, a first group of frequency multipliers coupled to the output of said crystal controlled oscillator, a second group of frequency multipliers coupled to the output of said first group of frequency multipliers, and a signal modulator, a power amplifier coupled to the output of said second group of frequency multipliers, means coupling the output of said signal modulator to said power amplifier for modulation thereof by the signal from said signal modulator; a second transmitter including a frequency modulation modulator, an aural oscillator coupled to said modulator, a first mixer circuit to add the signal output from said first group of frequency multipliers to a stabilized signal of said aural oscillator, a second mixer circuit coupled to the output of said first mixer circuit, a third group of frequency multipliers coupled to the output of said second mixer circuit, a power amplifier coupled to the output of said third group of multipliers, a crystal controlled reference oscillator, a frequency multiplier coupled between said reference oscillator and said second mixer, said second mixer subtracting the multiplied output of said reference oscillator from the output of said first mixer to accomplish an upward shift of the signal from said first group of frequency multipliers; and a center frequency stabilizing system coupled to said aural oscillator and said reference oscillator to maintain the mean center frequency of said aural oscillator constant with respect to the frequency of said reference oscillator.

10. A transmission system comprising a signal wave oscillator, a signal modulated oscillator, first and second mixing circuits, a reference oscillator, and a center frequency stabilizing system, means coupling the output of said modulated oscillator to said stabilizing system, means coupling the output of said reference oscillator to said stabilizing system, said stabilizing system comparing the phase of the output signals of said modulated oscillator and said reference oscillator for development of a control signal, means coupling the control signal to said modulated oscillator to stabilize the center frequency of said modulated oscillator, means coupling said first mixing circuit to the output of said signal wave oscillator, means coupling said first mixing circuit to the output of said modulated oscillator, said first mixing circuit adding the signal from said signal wave oscillator to the stabilized signal of said modulated oscillator, means coupling said second mixing circuit to the output of said first mixing circuit, and means coupling said second mixing circuit to the output of said reference oscillator, said second mixing circuit subtracting the signal from said reference oscillator from the resultant signal output of said first mixing circuit to provide a constant frequency offset between the signal from said signal wave oscillator and the resultant output of said second mixing circuit.

References Cited in the file of this patent

UNITED STATES PATENTS

| | | |
|---|---|---|
| 2,279,659 | Crosby | Apr. 14, 1942 |
| 2,584,780 | Beard et al. | Feb. 5, 1952 |
| 2,604,533 | Koros | July 22, 1952 |
| 2,605,425 | Hugenholtz | July 29, 1952 |